US010402003B2

(12) United States Patent
Leoni et al.

(10) Patent No.: US 10,402,003 B2
(45) Date of Patent: Sep. 3, 2019

(54) DISPLAY DEVICE

(71) Applicant: Hewlett-Packard Development Company, L.P., Fort Collins, CO (US)

(72) Inventors: Napoleon J Leoni, Palo Alto, CA (US); Omer Gila, Palo Alto, CA (US); Henryk Birecki, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 166 days.

(21) Appl. No.: 15/114,402

(22) PCT Filed: Jan. 31, 2014

(86) PCT No.: PCT/US2014/014308
§ 371 (c)(1),
(2) Date: Jul. 27, 2016

(87) PCT Pub. No.: WO2015/116212
PCT Pub. Date: Aug. 6, 2015

(65) Prior Publication Data
US 2016/0342266 A1 Nov. 24, 2016

(51) Int. Cl.
*G09G 3/34* (2006.01)
*G02F 1/167* (2019.01)
(Continued)

(52) U.S. Cl.
CPC ............ *G06F 3/0416* (2013.01); *G02F 1/167* (2013.01); *G06F 3/0383* (2013.01);
(Continued)

(58) Field of Classification Search
CPC .. G06F 3/0416; G06F 3/0412; G06F 3/03545; G06F 3/0383; G02F 1/167;
(Continued)

(56) References Cited

U.S. PATENT DOCUMENTS

| 4,558,334 A | 12/1985 | Fotland |
| 5,225,856 A | 7/1993 | Thieret et al. |

(Continued)

FOREIGN PATENT DOCUMENTS

| JP | 2002-350905 | 12/2002 |
| JP | 2005-208493 A | 8/2005 |

(Continued)

OTHER PUBLICATIONS

S. Yang, K, Zhou, E. Kreit, and J. Heikenfeld, Novel Devices Laboratory, School of Electronics and Computing Systems, University of Cincinnati, Cincinnati, Ohio 45221, USA Gamma Dynamics, Ohio 45221, USA (accepted Jul. 16, 2010; published online Oct. 4, 2010).

(Continued)

*Primary Examiner* — Grant Sitta
(74) *Attorney, Agent, or Firm* — Dicke Billig & Czaja PLLC

(57) ABSTRACT

A display device includes an electronic paper display, a ground electrode, and a first contact. The electronic paper display is imagable by receiving charges on an imaging surface of the electronic paper display. The ground electrode is opposite to the imaging surface of the electronic paper display. The first contact is on a surface of the display device and electrically coupled to a first side of the ground electrode.

20 Claims, 5 Drawing Sheets

(51) Int. Cl.
*G06F 3/038* (2013.01)
*G06F 3/0354* (2013.01)
*G06F 3/041* (2006.01)

(52) U.S. Cl.
CPC ........ *G06F 3/03545* (2013.01); *G06F 3/0412* (2013.01); *G09G 3/344* (2013.01); G09G 2300/0426 (2013.01); G09G 2330/04 (2013.01); G09G 2330/12 (2013.01); G09G 2380/14 (2013.01)

(58) Field of Classification Search
CPC ............... G09G 3/344; G09G 2330/04; G09G 2300/0426; G09G 2380/14; G09G 2330/12
USPC .......................................................... 345/108
See application file for complete search history.

(56) References Cited

U.S. PATENT DOCUMENTS

| | | | |
|---|---|---|---|
| 5,866,284 A | 2/1999 | Vincent | |
| 6,019,284 A * | 2/2000 | Freeman | G02F 1/13452 235/375 |
| 6,297,789 B2 * | 10/2001 | Gauthier | G06K 19/07 235/380 |
| 6,333,754 B1 | 12/2001 | Oba et al. | |
| 6,400,492 B1 | 6/2002 | Morita et al. | |
| 6,424,387 B2 | 7/2002 | Sato | |
| 6,515,790 B2 | 2/2003 | Miyamoto et al. | |
| 6,738,050 B2 | 5/2004 | Comiskey et al. | |
| 6,853,412 B2 * | 2/2005 | Stephenson | G06K 19/077 235/375 |
| 6,982,734 B2 | 1/2006 | Pan | |
| 7,140,550 B2 | 11/2006 | Ramachandran | |
| 7,360,688 B1 * | 4/2008 | Harris | G06K 7/0021 235/380 |
| 7,580,845 B2 | 8/2009 | Burman | |
| 7,784,687 B2 * | 8/2010 | Mullen | G06K 19/06206 235/380 |
| 7,789,489 B2 | 9/2010 | Matsuzoe | |
| 7,834,843 B2 | 11/2010 | Karaki | |
| 7,855,711 B2 | 12/2010 | Schmitz | |
| 8,018,410 B2 | 9/2011 | Schmitz et al. | |
| 8,144,388 B2 | 3/2012 | Ogawa | |
| 8,279,167 B2 | 10/2012 | Cato | |
| 8,393,546 B1 * | 3/2013 | Yen | G06K 19/06206 235/487 |
| 8,514,256 B2 | 8/2013 | Ogawa et al. | |
| 8,545,302 B2 | 10/2013 | Wu | |
| 9,619,741 B1 * | 4/2017 | Rigatti | G06K 19/06206 |
| 10,000,074 B2 | 6/2018 | Leoni et al. | |
| 2001/0020935 A1 | 9/2001 | Gelbman | |
| 2002/0021911 A1 | 2/2002 | Matsuura et al. | |
| 2003/0067427 A1 | 4/2003 | Comiskey et al. | |
| 2004/0263470 A1 | 12/2004 | Sprague et al. | |
| 2005/0134550 A1 | 6/2005 | Schmitz | |
| 2006/0017659 A1 | 1/2006 | Ogawa et al. | |
| 2006/0170981 A1 | 8/2006 | Ricks | |
| 2007/0045399 A1 | 3/2007 | Martin | |
| 2007/0143621 A1 * | 6/2007 | Jung | B41J 3/4076 713/176 |
| 2007/0188848 A1 | 8/2007 | Machida et al. | |
| 2007/0241201 A1 * | 10/2007 | Brown | G06Q 20/26 235/493 |
| 2008/0035738 A1 * | 2/2008 | Mullen | G06Q 20/04 235/492 |
| 2008/0297878 A1 | 12/2008 | Brown | |
| 2008/0308629 A1 | 12/2008 | Roskind | |
| 2009/0150295 A1 * | 6/2009 | Hatch | G06Q 20/3552 705/71 |
| 2009/0242648 A1 * | 10/2009 | Di Sirio | G06K 7/0008 235/492 |
| 2009/0290704 A1 * | 11/2009 | Cimino | G06Q 20/3552 380/28 |
| 2011/0081527 A1 | 4/2011 | Yamato | |
| 2011/0101098 A1 * | 5/2011 | Seppa | G06K 19/067 235/451 |
| 2011/0181532 A1 | 7/2011 | Pan et al. | |
| 2011/0254431 A1 | 10/2011 | Hirakawa | |
| 2011/0298760 A1 | 12/2011 | Gila et al. | |
| 2012/0206341 A1 | 8/2012 | Gila et al. | |
| 2012/0274616 A1 | 11/2012 | Scribner | |
| 2012/0320001 A1 | 12/2012 | Gila et al. | |
| 2013/0002530 A1 | 1/2013 | Hung et al. | |
| 2013/0003162 A1 | 1/2013 | Leoni | |
| 2013/0235446 A1 | 9/2013 | Leoni et al. | |
| 2014/0210805 A1 | 7/2014 | Birecki et al. | |
| 2014/0239068 A1 | 8/2014 | Park | |
| 2014/0253426 A1 | 9/2014 | Leoni et al. | |

FOREIGN PATENT DOCUMENTS

| | | |
|---|---|---|
| JP | 2006-035478 | 2/2006 |
| JP | 2008-149498 | 7/2008 |
| KR | 20080085263 | 9/2008 |
| KR | 10-2008-0109408 | 12/2008 |

OTHER PUBLICATIONS

High reflectivity electrofluidic pixels with zero-power grayscale operation S. Yang,1 K. Zhou,2 E. Kreit,1 and J. Heikenfeld1,a.
1 Novo Devices Laboratory School of Electronics and Computing Systems University of Cincinnati, Ohio 45221, USA Gamma Dynamics, Cincinnati, Ohio 45221, USA (Received May 19, 2010; accepted Jul. 16, 2010; published online Oct. 4, 2010).

\* cited by examiner

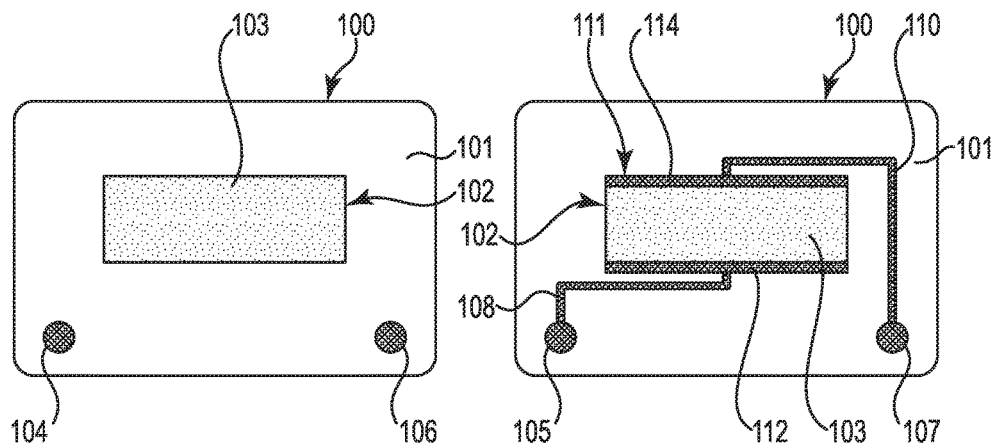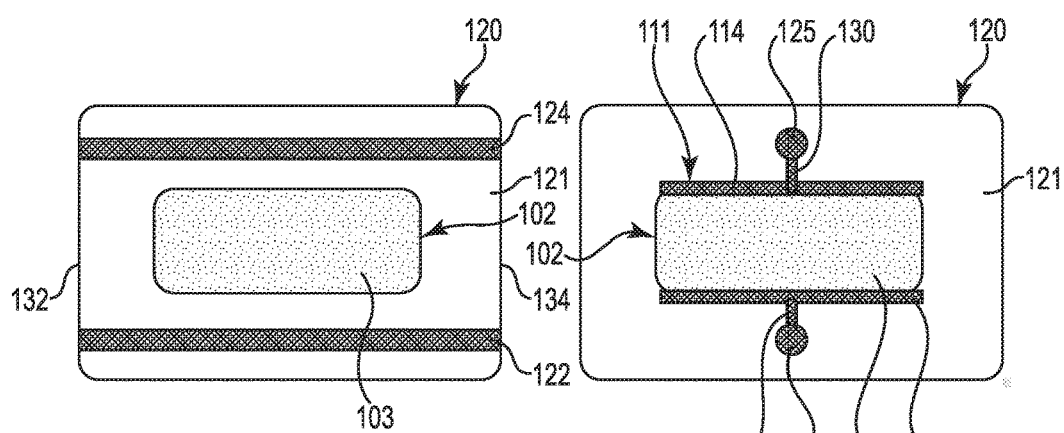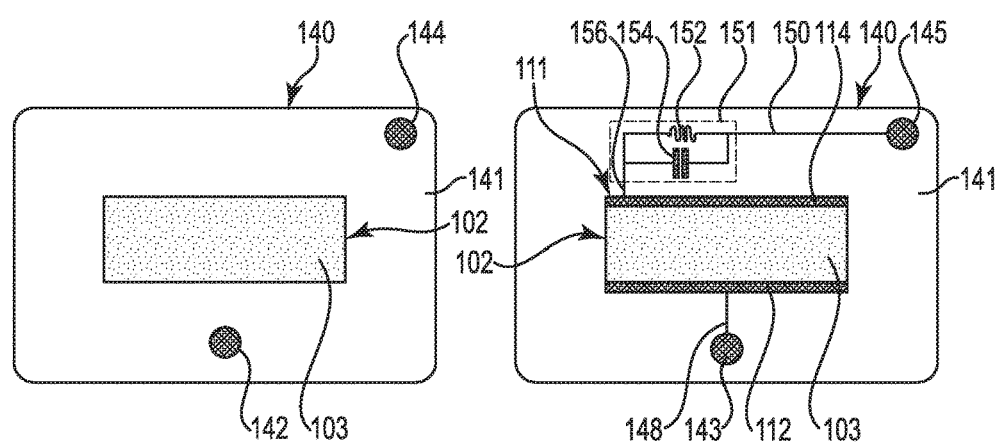

DISPLAY DEVICE

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

BRIEF DESCRIPTION OF THE DRAWINGS

FIG. 1A illustrates a top view of one example of a display device.

FIG. 1B illustrates an internal view of one example of the display device illustrated in FIG. 1A.

FIG. 2A illustrates a top view of another example of a display device.

FIG. 2B illustrates an internal view of one example of the display device illustrated in FIG. 2A.

FIG. 3A illustrates a top view of another example of a display device.

FIG. 3B illustrates an internal view of one example of the display device illustrated in FIG. 3A.

DETAILED DESCRIPTION

Figures 4A, 4B:
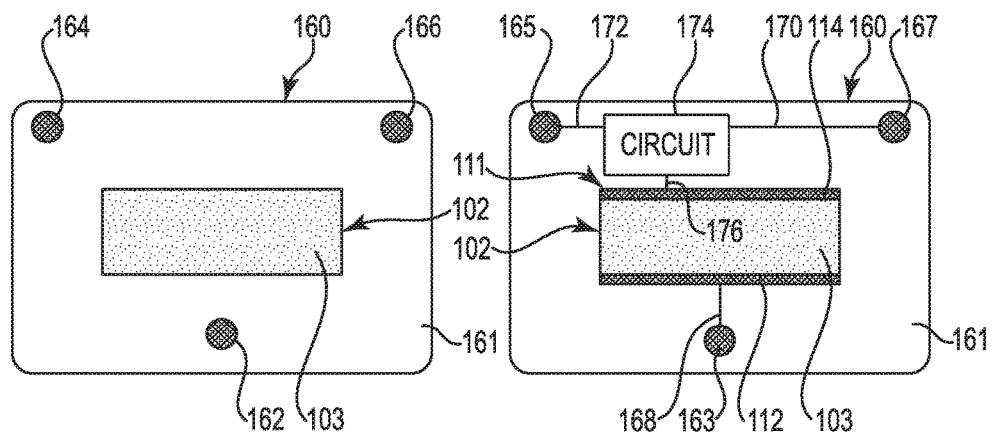
FIG. 4A illustrates a top view of another example of a display device.
FIG. 4B illustrates an internal view of one example of the display device illustrated in FIG. 4A.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Electronic paper ("e-paper") is used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those that are used in printing allows the e-paper to be read at a wide range of angles and lighting conditions, including full sunlight. The use of ambient light also eliminates the need for illumination produced by the device, such as a backlight. This minimizes the power used by the e-paper. In addition, the e-paper does not use power to maintain the image. Once the image is written, the image remains on the e-paper for an extended period of time or until the e-paper is rewritten. Thus, a typical e-paper primarily uses power for changing the optical state of the e-paper.

E-paper is typically written by generating a charge on a surface in proximately to a layer of microcapsules that contain charged pigment particles. The charge on the surface attracts or repels the charged pigment particles in the microcapsules to create the desired image. To write to an e-paper device, however, a writing module used to write to the e-paper has to maintain a connection to a ground return path for the e-paper. In addition, prior to writing to an e-paper device, the writing module should determine whether the e-paper device is functional, properly loaded, and can be used with the writing module.

The following disclosure describes several examples of e-paper display devices that enable a secure electrical connection between a writing module and a ground return path of an e-paper display device. The example display devices also enable verification of card presence and proper operation, prevent use of unauthorized display devices, and provide the ability to differentiate and identify different display devices based on predefined electrical signatures.

As used herein, the term "electrical signature" refers to the electrical properties (e.g., current components, AC and/or DC voltage components, frequency components), either instantaneous or over time, of an output signal from an element or circuit of a display device in response to a predetermined input signal to the element or circuit of the display device.

Accordingly, a display device, such as a gift card, prepaid card, credit card, shelf tag, boarding pass, shipping label, etc., includes a passive e-paper display and a ground electrode. The e-paper display is imagable by receiving charges on an imaging surface of the e-paper display from a writing module. The ground electrode is opposite to the imaging surface of the e-paper display. Prior to writing to the e-paper display, the writing module detects an electrical connection to the ground electrode to determine whether the display device is functional. In addition, the writing module may detect an electrical signature of the display device to determine whether the display device may be used with the writing module. The electrical signature may be provided by the electrical properties of the ground electrode and/or by a separate circuit within the display device.

FIG. 1A illustrates a top view and FIG. 1B illustrates an internal view of one example of a display device 100. Display device 100 includes a support structure 101, an e-paper display 102, a first contact 104, and a second contact 106. E-paper display 102 includes an imaging surface 103. The surface of e-paper display 102 opposite to imaging surface 103 contacts a ground electrode 111. Ground electrode 111 includes a first side 112 on a first side of e-paper display 102 and a second side 114 on a second side of e-paper display 102 opposite the first side. While not visible in FIG. 1B, ground electrode 111 extends between first side 112 and second side 114 opposite to imaging surface 103 of e-paper display 102.

Ground electrode 111 and e-paper display 102 are mounted in support structure 101 such that imaging surface 103 of e-paper display 102 is exposed. E-paper display 102 includes an active layer that switches color when a magnetic field or electrical charges are applied to imaging surface 103. In one example, the active layer contains a switchable pigment or die combination. A resin or polymer may be used to encapsulate the active layer. In addition, e-paper display 102 may include a functional coating on the imaging surface. In one example, e-paper display 102 has a thickness between 70 μm and 300 μm. One example of e-paper display 102 is further described below with reference to FIG. 6.

Ground electrode 111 provides a counter-electrode for the imaging of e-paper display 102 by a writing module. During writing of e-paper display 102, counter charges flow to ground electrode 111 from a writing module. Thus, display device 100 remains basically charge neutral despite charges being ejected onto imaging surface 103. Without a connection between ground electrode 111 and the writing module, no appreciable amount of charges can be ejected onto imaging surface 103 and thus no information can be written to display device 100. Ground electrode 111 can be composed of a transparent conductive material, such as indium tin oxide, or an opaque conductive material. In one example, ground electrode 111 has a thickness between 5 nm and 1 mm.

Support structure 101 can be composed of a transparent material or an opaque material. Support structure 101 can be composed of polyester, plastic, glass, transparent Mylar, or other suitable material. In one example, support structure 101 includes a bottom layer as illustrated in FIG. 1B and a top layer as illustrated in FIG. 1A. In one example, support structure 101 is shaped to provide a display device 100 in the form of a gift card, prepaid card, credit card, shelf tag, boarding pass, or shipping label.

First contact 104 is arranged on a surface of support structure 101 and is spaced apart from e-paper display 102. In one example, contact 104 is embedded within the surface of support structure 102 such that the surface of contact 104 is coplanar with the surface of support structure 101. First contact 104 is electrically coupled to first side 112 of ground electrode 111 through a via 105 and a conductor 108. Via 105 extends through an upper portion of support structure 101 to electrically couple contact 104 to conductor 108. Conductor 108 extends within structure 101 to electrically couple via 105 to first side 112 of ground electrode 111.

Second contact 106 is arranged on a surface of support structure 101 and is spaced apart from e-paper display 102 and first contact 104. In one example, contact 106 is embedded within the surface of support structure 102 such that the surface of contact 106 is coplanar with the surface of support structure 101. Second contact 106 is electrically coupled to second side 114 of ground electrode 111 through a via 107 and a conductor 110. Via 107 extends through the upper portion of support structure 101 to electrically couple second contact 106 to conductor 110. Conductor 110 extends within structure 101 to electrically couple via 107 to second side 114 of ground electrode 111.

In this example, first contact 104, second contact 106, and imaging surface 103 of e-paper display 102 are on the same side of display device 100. In other examples, first contact 104, second contact 106, and/or imaging surface 103 of e-paper display 102 can be on opposite sides of display device 100. While first contact 104 is illustrated as being in the lower left corner of display device 100 and second contact 106 is illustrated as being in the lower right corner of display device 100, first contact 104 and second contact 106 can be located at any suitable location on support structure 101.

First contacts 104 and second contact 106 are composed of any suitable electrically conductive material, such as a metal or a printed layer (e.g., digitally printed or screen printed) of conductive ink. In this example, first contact 104 and second contact 106 are circle shaped. In other examples, first contact 104 and second contact 106 can be any suitable shape, such as square, rectangular, or hexagon. Vias 105 and 107 and conductors 108 and 110 are composed of any suitable electrically conductive material, such as a metal or a printed layer (e.g., digitally printed or screen printed) of conductive ink.

To write to display device 100, a writing module is electrically connected to first contact 104 and second contact 106. First contact 104 and/or second contact 106 provide a ground return path between the writing module and display device 100. In addition, prior to writing to display device 100, a sensor circuit of the writing module can determine whether display device 100 is functional and whether display device 100 can be used with the writing module. In this example, the sensor circuit senses the impedance of ground electrode 111 between the first side 112 and the second side 114 through the electrical connections provided by first contact 104 and second contact 106. By comparing the sensed impedance to an expected value, the sensor circuit determines whether display device 100 is functional and can be used with the writing module. For example, if the sensed impedance is not within a range of expected values, the writing module will not write to display device 100.

FIG. 2A illustrates a top view and FIG. 2B illustrates an internal view of another example of a display device 120. Display device 120 includes a support structure 121, an e-paper display 102, a first contact 122, and a second contact 124. First contact 122 is arranged on a surface of support structure 121 and is spaced apart from e-paper display 102. First contact 122 is stripe shaped and extends from a first edge 132 of support structure 121 to a second edge 134 of support structure 121 opposite to the first edge 132. First contact 122 is electrically coupled to first side 112 of ground electrode 111 through a via 123 and a conductor 128. Via 123 extends through an upper portion of support structure 121 to electrically couple contact 122 to conductor 128. Conductor 128 extends within support structure 121 to electrically couple via 123 to first side 112 of ground electrode 111.

Second contact 124 is arranged on a surface of support structure 121, on the opposite side of e-paper display 102 from first contact 122, and spaced apart from e-paper display 102. Second contact 124 is stripe shaped and extends from first edge 132 of support structure 121 to second edge 134 of support structure 121 such that second contact 124 is substantially parallel to first contact 122. Second contact 124 is electrically coupled to second side 114 of ground electrode 111 through a via 125 and a conductor 130. Via 125 extends through the upper portion of support structure 121 to electrically couple second contact 124 to conductor 130. Conductor 130 extends within support structure 121 to electrically couple via 125 to second side 114 of ground electrode 111.

First contact 122 and second contact 124 are parallel to the writing direction of display device 120. In one example, first contact 122 and second contact 124 are embedded within the surface of support structure 121 such that the surface of first contact 122 and the surface of second contact 124 are coplanar with the surface of support structure 121. In this example, first contact 122, second contact 124, and imaging surface 103 of e-paper display 102 are on the same side of display device 120. In other examples, first contact 122, second contact 124, and/or imaging surface 103 of e-paper display 102 can be on opposite sides of display device 120.

First contact 122 and/or second contact 124 are likely to be contacted by a user when display device 120 is handled.

This contact between a user and first contact 122 and/or second contact 124 provides a positive consequence in that if the user is storing any electrostatic charge, display device 120 will be equipotential with the user, thus minimizing the chance of accidental image modifications due to electrostatic discharges.

Display device 120 operates similarly to display device 100 previously described and illustrated with reference to FIGS. 1A-1B, except that display device 120 enables conductive rollers or brushes to maintain an electrical connection to first contact 122 and second contact 124 as display device 120 and a writing module are moved relative to each other.

FIG. 3A illustrates a top view and FIG. 3B illustrates an internal view of another example of a display device 140. Display device 140 includes a support structure 141, an e-paper display 102, a first contact 142, and a second contact 144. First contact 142 is arranged on a surface of support structure 141 and is spaced apart from e-paper display 102. In this example, first contact 142 is circle shaped. In other examples, first contact 142 can be any suitable shape, such as square, rectangular, or hexagon. First contact 142 may also be stripe shaped and extend from a first edge of support structure 141 to a second edge of support structure 141 opposite to the first edge. First contact 142 is electrically coupled to first side 112 of ground electrode 111 through a via 143 and a conductor 148. Via 143 extends through an upper portion of support structure 141 to electrically couple first contact 142 to conductor 148. Conductor 148 extends within support structure 141 to electrically couple via 143 to first side 112 of ground electrode 111.

Second contact 144 is arranged on a surface of support structure 141, on the opposite side of e-paper display 102 from first contact 142, and spaced apart from e-paper display 102. In this example, second contact 144 is circle shaped. In other examples, second contact 144 can be any suitable shape, such as square, rectangular, or hexagon. Second contact 144 is electrically coupled to second side 114 of ground electrode 111 through via a 145, a conductor 150, a display device circuit 151, and a conductor 156. Circuit 151 is a Resistor-Capacitor (RC) network including a resistor 152 and a capacitor 154.

Via 145 extends through the upper portion of support structure 141 to electrically couple second contact 144 to conductor 150. Conductor 150 is electrically coupled to one side of resistor 152 and one side of capacitor 154. The other side of resistor 152 and the other side of capacitor 154 are electrically coupled to second side 114 of ground electrode 111 through conductor 156. Conductor 150, resistor 152, capacitor 154, and conductor 156 extend within support structure 141 and are composed of any suitable electrically conductive material, such as a metal or a printed layer (e.g., digitally printed or screen printed) of conductive ink.

In one example, first contact 142 and second contact 144 are embedded within the surface of support structure 141 such that the surface of first contact 142 and the surface of second contact 144 are coplanar with the surface of support structure 141. In this example, first contact 142, second contact 144, and imaging surface 103 of e-paper display 102 are on the same side of display device 140. In other examples, first contact 142, second contact 144, and/or imaging surface 103 of e-paper display 102 can be on opposite sides of display device 140.

RC network 151 provides an electrical signature for display device 140. In response to a writing module electrically contacting first contact 142 and second contact 144 and inputting a test signal to one of first contact 142 and second contact 144, display device 140 provides an output signal on the other of first contact 142 and second contact 144. The output signal is dependent on ground electrode 111 and RC circuit 151. RC circuit 151 can be selected to provide a desired output signal in response to an input signal. Therefore, by analyzing the output signal, the writing module can determine whether display device 140 is functional and may be used with the writing module. For example, if the output signal is not within an expected range, the writing module will not write to display device 140.

FIG. 4A illustrates a top view and FIG. 4B illustrates an internal view of another example of a display device 160. Display device 160 includes a support structure 161, an e-paper display 102, a display device circuit 174, a first contact 162, a second contact 164, and a third contact 166. First contact 162 is arranged on a surface of support structure 161 and is spaced apart from e-paper display 102. In this example, first contact 162 is circle shaped. In other examples, first contact 162 can be any suitable shape, such as square, rectangular, or hexagon. First contact 162 is electrically coupled to first side 112 of ground electrode 111 through a via 163 and a conductor 168. Via 163 extends through an upper portion of support structure 161 to electrically couple contact 162 to conductor 168. Conductor 168 extends within support structure 161 to electrically couple via 163 to first side 112 of ground electrode 111.

Second contact 164 is arranged on a surface of support structure 161, on the opposite side of e-paper display 102 from first contact 162, and spaced apart from e-paper display 102. In this example, second contact 164 is circle shaped. In other examples, second contact 164 can be any suitable shape, such as square, rectangular, or hexagon. Second contact 164 is electrically coupled to circuit 174 through a via 165 and a conductor 172. Via 165 extends through the upper portion of support structure 161 to electrically couple second contact 164 to conductor 172. Conductor 172 is electrically coupled to a first terminal of circuit 174.

Third contact 166 is arranged on a surface of support structure 161, on the opposite side of e-paper display 102 from first contact 162, and spaced apart from e-paper display 102. In this example, second contact 166 is circle shaped. In other examples, second contact 166 can be any suitable shape, such as square, rectangular, or hexagon. Third contact 166 is electrically coupled to circuit 174 through a via 167 and a conductor 170. Via 167 extends through the upper portion of support structure 161 to electrically couple second contact 166 to conductor 170. Conductor 170 is electrically coupled to a second terminal of circuit 174. A third terminal of circuit 174 is electrically coupled to second side 114 of ground electrode 111 through a conductor 176. Conductors 170, 172, and 176 and circuit 174 extend within support structure 161.

In one example, first contact 162, second contact 164, and third contact 166 are embedded within the surface of support structure 161 such that the surface of first contact 162, the surface of second contact 164, and the surface of the third contact 166 are coplanar with the surface of support structure 161. In this example, first contact 162, second contact 164, third contact 166, and imaging surface 103 of e-paper display 102 are on the same side of display device 160. In other examples, first contact 162, second contact 164, third contact 166, and/or imaging surface 103 of e-paper display 102 can be on opposite sides of display device 160.

Circuit 174 can include any suitable components, such as passive components and/or active components. Circuit 174 can be composed of a printed layer (e.g., digitally printed or screen printed) of conductive ink. In other examples, circuit 174 can be an integrated circuit chip embedded within support structure 161. Circuit 174 can also be used to identify display device 160 by including a unique identifier. In one example, contact 162 is used to input a test signal to circuit 174 through conductor 168, ground electrode 111, and conductor 176, and contacts 164 and 166 are used to power circuit 174 by electrically connecting circuit 174 between a voltage source and a common or ground.

Circuit 174 provides an electrical signature for display device 160. In response to a writing module electrically contacting first contact 162, second contact 164, and third contact 166 and inputting a test signal to one of first contact 162, second contact 164, and third contact 166, display device 160 provides an output signal on another one of the first contact 162, second contact 164, and third contact 166. The output signal is dependent on ground electrode 111 and circuit 174. Circuit 174 can be selected to provide a desired output signal in response to an input signal. Therefore, by analyzing the output signal, the writing module can determine whether display device 160 is functional and may be used with the writing module. For example, if the output signal is not within an expected range, the writing module will not write to display device 160.

Figures 5A, 5B:
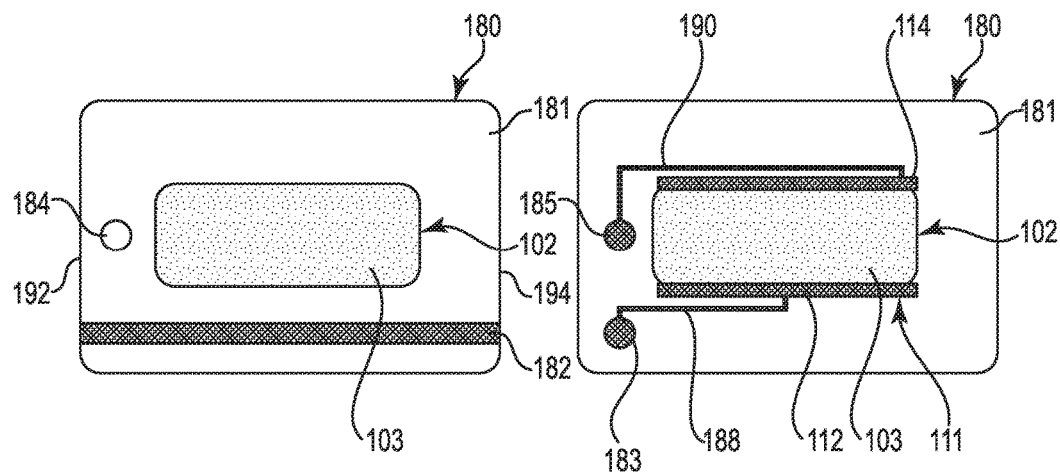
FIG. 5A illustrates a top view of another example of a display device.
FIG. 5B illustrates an internal view of one example of the display device illustrated in FIG. 5A.

FIG. 5A illustrates a top view and FIG. 5B illustrates an internal view of another example of a display device 180. Display device 180 includes a support structure 181, an e-paper display 102, a contact 182, and a charge receiving portion 184. Contact 182 is arranged on a surface of support structure 181 and is spaced apart from e-paper display 102. Contact 182 is stripe shaped and extends from a first edge 192 of support structure 181 to a second edge 194 of support structure 181 opposite to the first edge 192. Contact 182 is electrically coupled to first side 112 of ground electrode 111 through a via 183 and a conductor 188. Via 183 extends through an upper portion of support structure 181 to electrically couple contact 182 to conductor 188. Conductor 188 extends within support structure 181 to electrically couple via 183 to first side 112 of ground electrode 111.

Charge receiving portion 184 is arranged on a surface of support structure 181 and is aligned with a portion of e-paper display 102. In this example, charge receiving portion 184 is circle shaped. In other examples, charge receiving portion 184 can be any suitable shape, such as square, rectangular, or hexagon. In one example, charge receiving portion 184 is embedded within the surface of support structure 181 such that charge receiving portion 184 is not visible to a user. In this example, the portion of support structure 181 above charge receiving portion 184 may have a local electrical conductivity higher than the rest of support structure 181 without providing any visual clues as to this difference. In one example, the higher electrical conductivity is provided by doping with conductive agents. In another example, carbon black may be used to provide the higher electrical conductivity if the area can be concealed within a printed area.

Charge receiving portion 184 is electrically coupled to second side 114 of ground electrode 111 through a via 185 and a conductor 190. Via 185 extends through the upper portion of support structure 181 to electrically couple charge receiving portion 185 to conductor 190. Conductor 190 extends within structure 181 to electrically couple via 185 to second side 114 of ground electrode 111.

To write to display device 180, a writing module is electrically connected to contact 182. Contact 182 provides a ground return path between the writing module and display device 180. In addition, prior to writing to display device 180, the writing module ejects charges onto charge receiving portion 184. A sensor circuit of the writing module can then sense a signal through contact 182 in response to the deposited charges to determine whether display device 180 is functional and whether display device 180 can be used with the writing module. For example, if no signal is detected in response to the deposited charges on charge receiving portion 184, the writing module will not write to display device 180.

Figure 6:
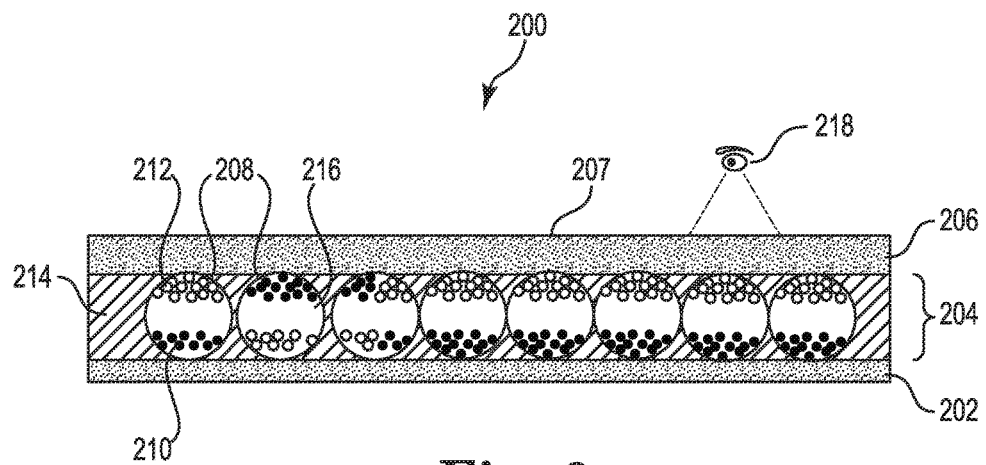
FIG. 6 illustrates a cross-sectional view of one example of an electronic paper ("e-paper") display.

FIG. 6 illustrates a cross-sectional view of one example of an e-paper display 200. In one example, e-paper display 200 is used for e-paper display 102 previously described and illustrated with reference to FIGS. 1A-5B. E-paper display 200 includes a ground electrode 202, an active layer 204, and a transparent charge receiving layer 206. Active layer 204 includes microcapsules 208 encapsulated by a resin or polymer 214. In one example, each microcapsule 208 includes black particles 210 and white particles 212 suspended in a fluid medium 216. Surface 207 of charge receiving layer 206 provides the imaging surface for e-paper display 200 and is also the viewing side for a viewer 218 in this example.

Ambient light is transmitted through charge receiving layer 206, strikes microcapsules 208, and is reflected back to the viewer 218. When white particles 212 of a microcapsule 208 are located near charge receiving layer 206, the microcapsule appears white to the viewer 218. When black particles 210 of a microcapsule 208 are located near charge receiving layer 206, the microcapsule appears black to the viewer 218. The particles 210 and 212 have opposite charges. For example, black particles 210 can be positively charged particles, and white particles 212 can be negatively charged particles. Various shades of gray can be created by varying the arrangement of alternating microcapsules with white and black particles located near charge receiving layer 206 to produce halftoning.

Microcapsules 208 exhibit image stability using chemical adhesion between particles and/or between the particles and the microcapsule surface. For example, microcapsules 208 can hold text and images indefinitely without using electricity, while allowing the text or images to be changed later. The diameter of each microcapsule 208 is substantially constant within e-paper display 200 and can be in one example between 20 μm and 100 μm, such as 50 μm.

The structure, materials, and dimensions of the various layers and components of e-paper display 200 can be adapted to specific design criteria. In one example, the transparent charge receiving layer 206 can be composed of a transparent polymer and can have a thickness between 50 μm and 250 μm. The transparent charge receiving layer 206 can also be composed of a material that holds charges or is porous or semi-porous to charges and/or ions. Conductive ground electrode 202 can be composed of a transparent conductive material, such as indium tin oxide, or an opaque material. In one example, ground electrode 202 has a thickness between 10 nm and 1 mm, or larger depending on how e-paper display 200 is to be used.

In other examples, e-paper display 200 has a variety of other configurations. For example, each microcapsule 208 may include black particles suspended in a white colored fluid. The black particles can be positively charged particles or negatively charged particles. One or more microcapsules form a pixel of black and white images displayed on e-paper display 200. The black and white images are created by placing black particles near or away from charge receiving layer 206. For example, the microcapsules with black particles located away from charge receiving layer 206 reflect white light, corresponding to a white portion of an image displayed on e-paper display 200. In contrast, the microcapsules with black particles located near charge receiving layer 206 appear black to a viewer 218 corresponding to a black portion of the image displayed on e-paper display 200. Various shades of gray can be created by using halftoning with black particles located near or away from charge receiving layer 206.

Charge receiving layer 206 may be tinted with alternating blue, red, and green regions. Adjacent blue, red, and green regions form color pixels. Color images are created by placing different combinations of white or black particles near charge receiving layer 206. For example, the microcapsules of a color pixel with white particles located near the red and green regions of charge receiving layer 206 reflect red and green light from e-paper display 200. The viewer 218 will perceive this combination as a yellow pixel. When the black particles in the microcapsules are located near charge receiving layer 206, that color pixel will appear black to the viewer 218. Additionally or alternatively, the black particles 210 of each microcapsule can be replaced by blue, red, or green positively or negatively charged particles. The particles can be used alone or in combination with a tinted charge receiving layer 206 to create a desired color image.

Figure 7:
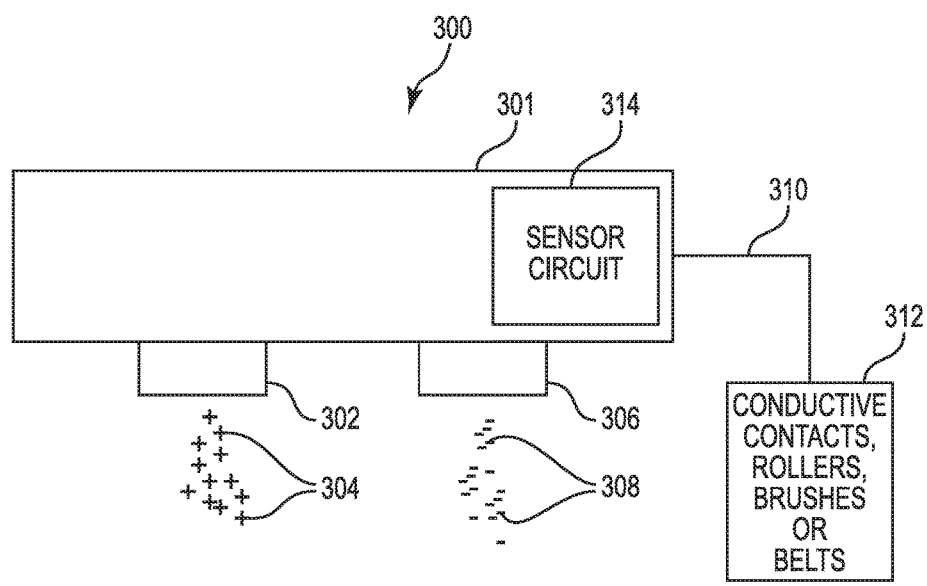
FIG. 7 illustrates one example of a writing module.

FIG. 7 illustrates one example of a writing module 300. Writing module 300 can be used to write information to display device 100, 120, 140, 160, and/or 180 previously described and illustrated with reference to FIGS. 1A-5B. Writing module 300 includes an imaging unit 301 and conductive contacts, rollers, brushes, or belts 312. Conductive contacts, rollers, brushes, or belts 312 are electrically coupled to imaging unit 301 through signal path 310. Imaging unit 301 includes a sensor circuit 314, a corona writing unit 302, and a corona erasing unit 306. Corona writing unit 302 and corona erasing unit 306 are located on the same side of imaging unit 301.

Corona erasing unit 306 selectivity ejects negative ions 308 toward an imaging surface of an e-paper display to erase any text and/or images on the e-paper display by repelling the negatively charged particles and/or by attracting the positively charged particles within the e-paper display toward the imaging surface. Corona writing unit 302 selectively ejects positive ions 304 toward an imaging surface of an e-paper display to write desired text and/or images on the e-paper display by repelling the positively charged particles and/or by attracting the negatively charged particles within the e-paper display toward the imaging surface.

Conductive contacts, rollers, brushes, or belts 312 make contact with the first, second, and/or third contacts of a display device during writing of the display device to provide an electrical connection to the ground electrode of the display device and to determine whether the device is functional and can be used with the writing module 301. When using conductive rollers or belts, the rollers or belts can also set the spacing between corona writing unit 302 and corona erasing unit 306 and the display device during writing of the display device. The conductive rollers or belts are composed of any suitable electrically conductive material, such as a metal or conductive rubber. When using a conductive brush, the brush is composed of any suitable electrically conductive material, such as a metal or carbon.

Sensor circuit 314 determines whether a display device is functional and can be used with writing module 301 based on the electrical signature of the display device. Prior to writing to a display device, sensor circuit 314 is electrically coupled to the display device through conductive contacts, rollers, brushes, or belts 312. Sensor circuit 314 applies an input signal to the display device and senses an output signal from the display device in response to the input signal. Sensor circuit 314 analyzes the output signal to determine whether the display device is functional and can be used with writing module 301. If no output signal is received from the display device in response to the input signal or if the output signal is different from an expected signal, then writing module 301 will not write to the display device.

Figure 8A:
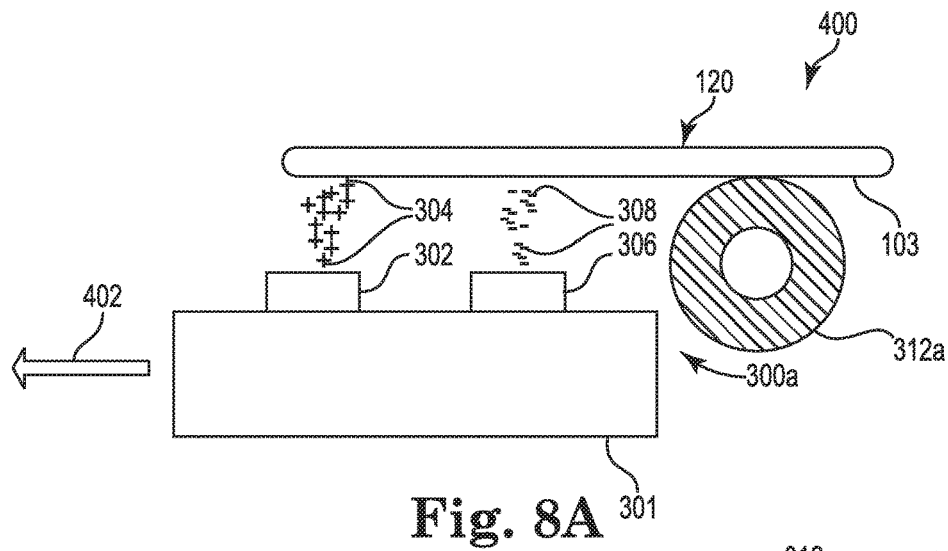
FIGS. 8A-8C illustrate one example of a system including a writing module and a display device.
Figure 8B:
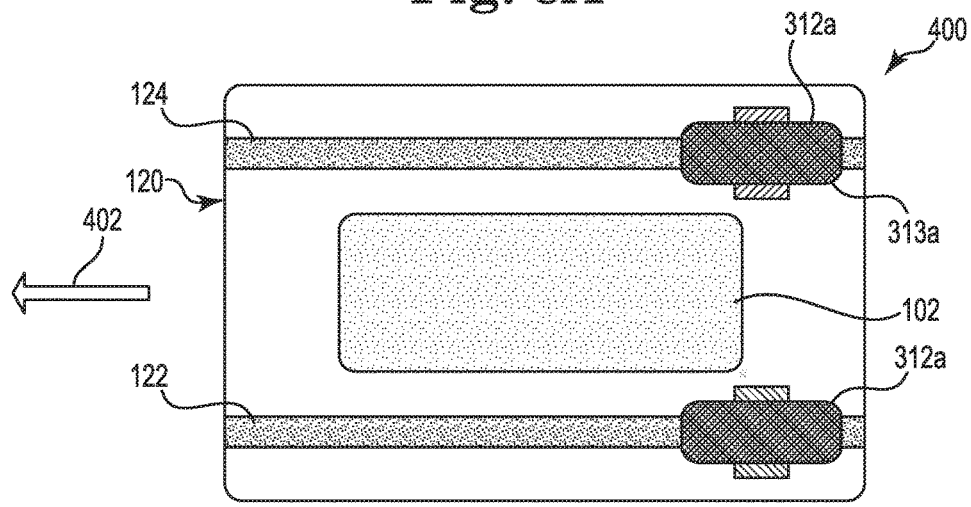
Figure 8C:
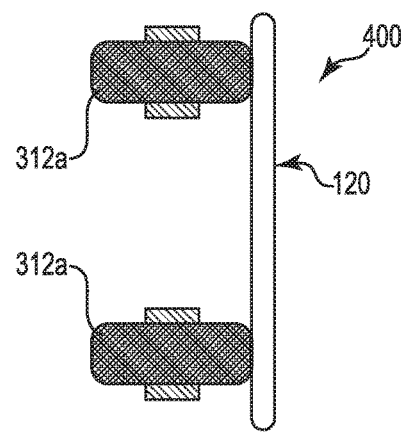

FIGS. 8A-8C illustrate one example of a system 400 including a writing module 300a and a display device 120. Writing module 300a is similar to writing module 300 previously described and illustrated with reference to FIG. 7, and display device 120 was previously described and illustrated with reference to FIGS. 2A-2B. In this example, writing module 300a includes conductive rollers 312a. To write to display device 120, writing module 300a is brought into contact with display device 120 so that a first conductive roller 312a contacts first contact 122 and a second conductive roller 312a contacts second contact 124 as best illustrated in the top view of FIG. 8B and the side view of FIG. 8C. Conductive rollers 312a electrically couple imaging unit 301 to first side 112 and second side 114 of ground electrode 111 (FIG. 2B) of display device 120 through first contact 122 and second contact 124.

Writing module 300a can be moved in the direction indicated by arrow 402 and display device 120 can be held stationary, display device 120 can be moved in the opposite direction indicated by arrow 402 and writing module 300a can be held stationary, or display device 120 and writing module 300a can be moved simultaneously with respect to each other. While writing module 300a and display device 120 are moved relative to each other, conductive rollers 312a maintain an electrical connection to first contact 122 and second contact 124 during the writing of e-paper display 102.

In this example, e-paper display 102 of display device 120 includes microcapsules including positively charged black particles and negatively charged white particles. Corona erasing unit 306 erases any information stored in the microcapsules prior to writing information with corona writing unit 302. As display device 120 passes over imaging unit 301, corona erasing unit 306 ejects negative ions 308 onto imaging surface 103. The negative ions 308 repel negatively charged white particles away from imaging surface 103 and attract positively charged black particles toward imaging surface 103. By passing corona erasing unit 306 over imaging surface 103, any information previously written to display device 120 is erased by positioning the positively charged black particles near the top of the microcapsules and pushing the negatively charged white particles to the bottom of the microcapsules.

Corona writing unit 302 writes information to the microcapsules. As display device 120 passes over imaging unit 301, corona writing unit 302 selectively ejects positive ions 304 toward imaging surface 103 when a region of display device 120 is to be changed from black to white. The positive ions 304 repel positively charged black particles away from imaging surface 103 and attract negatively charged white particles toward imaging surface 103. By passing corona writing unit 302 over imaging surface 103 and selectively ejecting positive ions onto imaging surface 103, information is written to display device 120 by selectively positioning negatively charged white particles near the top of the microcapsules and selectively pushing the positively charged black particles to the bottom of the microcapsules.

Figure 9A:
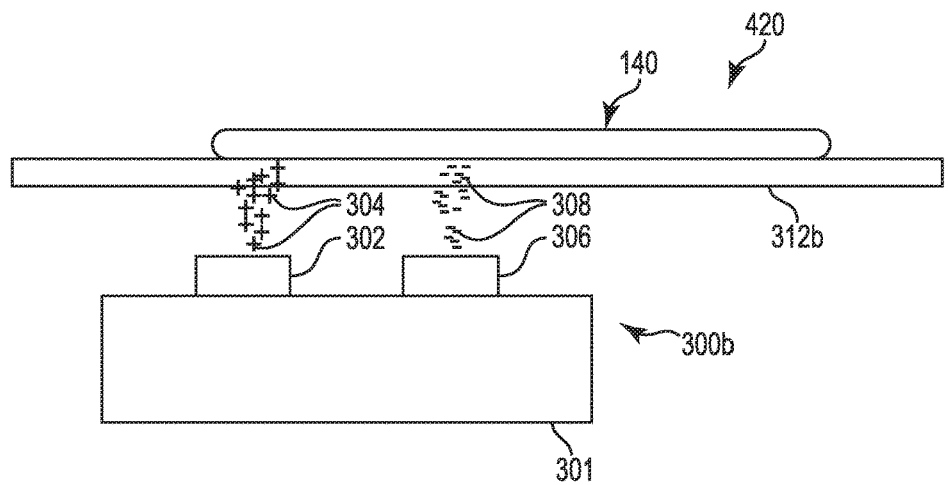
FIGS. 9A-9C illustrate another example of a system including a writing module and a display device.
Figure 9B:
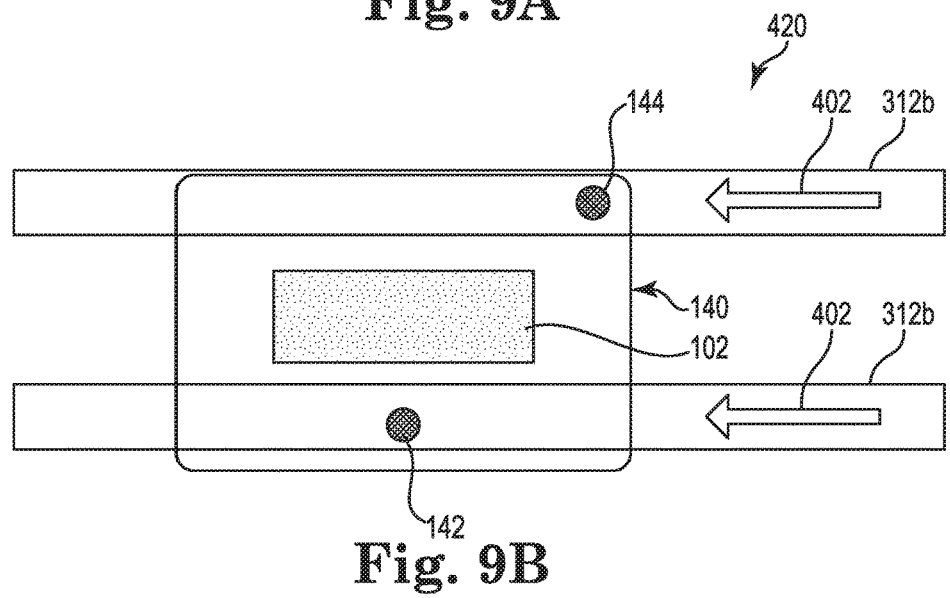
Figure 9C:
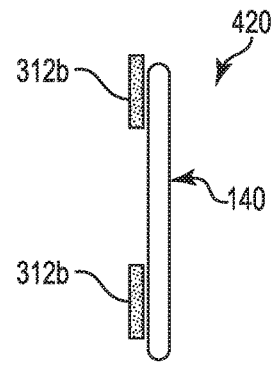

FIGS. 9A-9C illustrate another example of a system 420 including a writing module 300b and a display device 140.

Writing module 300b is similar to writing module 300 previously described and illustrated with reference to FIG. 7, and display device 140 was previously described and illustrated with reference to FIGS. 3A-3B. In this example, writing module 300b includes conductive belts 312b. To write to display device 140, writing module 300b is brought into contact with display device 140 so that a first conductive belt 312b contact first contact 142 and a second conductive belt 312b contacts second contact 144 as best illustrated in the top view of FIG. 9B and the side view of FIG. 9C. Conductive belts 312b electrically couple imaging unit 301 to the first side 112 and of ground electrode 111 and to RC network 151 (FIG. 3B) of display device 140 through first contact 142 and second contact 144. System 420 writes to display device 140 similarly to system 400 previously described and illustrated with reference to FIGS. 8A-8C.

By sensing an electrical signature of a display device prior to writing to the display device, a writing module can determine both whether the display device is functional and whether the display device may be used with the writing module. If no output signal is received from a display device in response to an input signal or if the output signal is not as expected, the writing module will not write to the display device. In this way, the use of counterfeit display devices may be prevented and different display devices may be identified based on their electrical signatures.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A display device comprising:
an electronic paper display imagable by receiving charges on an imaging surface of the electronic paper display;
a ground electrode opposite to the imaging surface of the electronic paper display;
a first contact on a surface of the display device and electrically connected to a first side of the ground electrode;
a signature circuit connected to a second side of the ground electrode, the second side different from the first side; and
a second contact electrically coupled to the second side of the ground electrode through the signature circuit,
wherein the second contact is to output an electrical signature comprising an impedance of the display device in response to a test signal applied to the first contact, the electrical signature based on the signature circuit.

2. The display device of claim 1,
wherein the electrical signature comprises the impedance of the signature circuit.

3. The display device of claim 1, wherein the first contact, the second contact, and the imaging surface of the electronic paper display are on a same side of the display device.

4. The display device of claim 1, wherein the first contact is stripe shaped and extends from a first edge of the display device to a second edge of the display device opposite to the first edge, and
wherein the second contact is stripe shaped and extends from the first edge of the display device to the second edge of the display device.

5. The display device of claim 4, wherein the first contact and the second contact prevent disruption of an image of the electronic paper display from electrostatic discharges when a user contacts the first contact or the second contact.

6. A display device comprising:
an electronic paper display imagable by receiving charges on an imaging surface of the electronic paper display;
a ground electrode opposite to the imaging surface of the electronic paper display;
a first contact on a surface of the display device and electrically connected to a first side of the ground electrode;
a circuit electrically connected to a second side of the ground electrode, the second side different from the first side; and
a second contact on the surface of the display device and electrically connected to the circuit,
wherein the second contact is to output an electrical signature based on an impedance of the circuit in response to a test signal applied to the first contact.

7. The display device of claim 6, wherein the circuit comprises a passive component.

8. The display device of claim 7, wherein the circuit comprises a resistor and capacitor network.

9. The display device of claim 6, wherein the circuit comprises an active component that outputs a unique identifier.

10. The display device of claim 6, wherein the circuit comprises conductive ink.

11. A system comprising:
a writing unit comprising a sensor and electrically conductive contacts, the electrically conductive contacts to electrically contact a display device to write to the display device, the display device comprising:
a support structure;
a ground electrode on the support structure;
an electronic paper display on the ground electrode, the electronic paper display imagable by receiving charges on an imaging surface of the electronic paper display from the writing unit; and
a first contact on a surface of the support structure, the first contact electrically connected to a first side of the ground electrode;
a signature circuit electrically connected to a second side of the ground electrode, the second side different from the first side; and
a second contact electrically coupled to the second side of the ground electrode through the signature circuit,
wherein the first and second contacts are to electrically contact the electrically conductive contacts of the writing unit to perform the write of the display device,
wherein the sensor is to detect an electrical signature comprising an impedance from the second contact in response to a test signal applied to the first contact, the electrical signature based on the signature circuit.

12. The system of claim 11,
wherein the sensor is to measure an impedance of the second contact.

13. The system of claim 11,
wherein the writing unit is to determine whether the display device may be used with the writing unit based on the electrical signature.

14. The system of claim 11, wherein the writing unit is to eject negative ions towards the imaging surface to erase an image on the imaging surface.

15. The display device of claim 1, wherein the electrical signature is provided to a writing unit in response to electrical connection with the writing unit.

16. The display device of claim 1, wherein the signature circuit comprises the impedance on which the electrical signature is based.

17. The display device of claim 1, wherein the signature circuit comprises a resistor-capacitor circuit.

18. The display device of claim 1, wherein the signature circuit comprises an active component that outputs a unique identifier.

19. The display device of claim 6, wherein the first contact is stripe shaped and extends from a first edge of the display device to a second edge of the display device opposite to the first edge.

20. The system of claim 14, wherein the writing unit is to eject positive ions towards the imaging surface to write an image onto the imaging surface.

\* \* \* \* \*